Sept. 13, 1955 M. PERSON 2,717,990
FUEL OIL CONTAMINATION DETECTOR
Filed Nov. 16, 1954 2 Sheets-Sheet 2
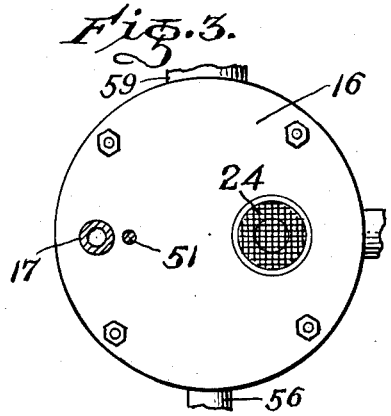
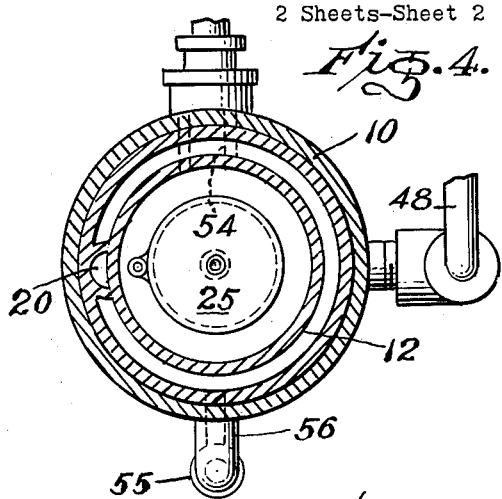
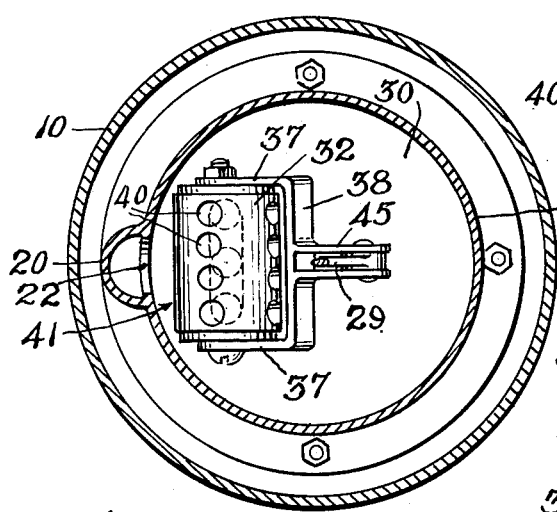
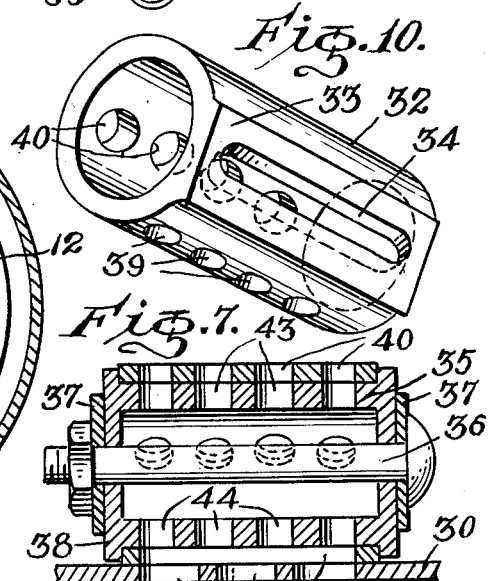
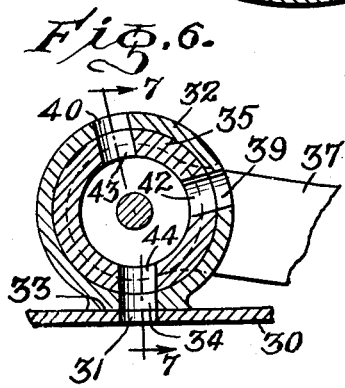
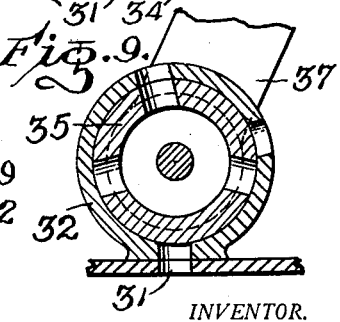
INVENTOR.
Mack Person,
BY F. Ledermann
ATTORNEY.

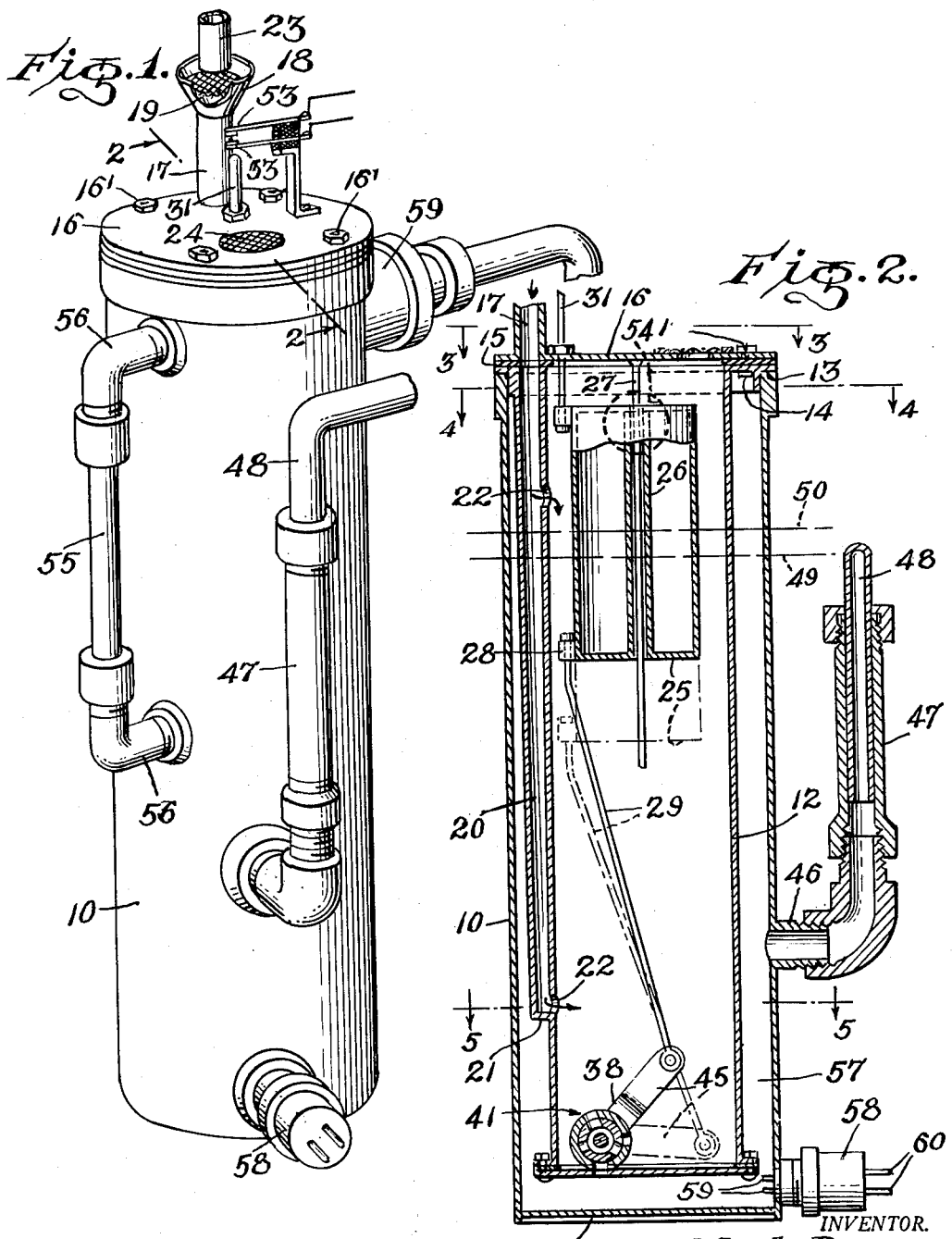

United States Patent Office 2,717,990
Patented Sept. 13, 1955

2,717,990

FUEL OIL CONTAMINATION DETECTOR

Mack Person, Rockville Centre, N. Y.

Application November 16, 1954, Serial No. 469,105

5 Claims. (Cl. 340—242)

This invention relates to devices or apparatus to detect the contamination of or presence in water of an excess of oil which has leaked into a water circulating or transporting system. The problem of detecting contaminating oil rises particularly in installations using oil for fuel, as well as for lubrication, but it is particularly fuel oil which may be troublesome in the case of oil fired steam installations such as are used on ships.

The main object of the present invention is the provision of an oil contamination detector adapted to be installed in the water feed or intake line of a water circulating or transporting system, to give a visible indication of an excess of oil in the intake water, in the form of an indication on the detector itself or of a signal flashed on a board through the closing of an electrical circuit. The signal may, of course, also be provided audibly, in addition to or independently of, a visual signal.

Another object of the invention is the provision of an oil contamination indicator in unitary and compact form, so that it may readily be installed in existing water systems endangered by oil contamination, with a minimum of cost and with a minimum of attention in use. At present many ships especially are without such detectors or other means for indicating oil contamination and eliminating the excess oil, and the cost of installation of the necessary safety provisions is too high in many cases.

The above broad as well as additional and more specific objects will be clarified in the following description wherein characters of reference refer to like-numbered parts in the accompanying drawings. It is to be noted that the drawings are intended solely for the purpose of illustration and that it is therefore neither desired nor intended to limit the invention necessarily to any or all of the exact details of construction shown or described except insofar as they may be deemed essential to the invention.

Referring briefly to the drawings, Fig. 1 is a perspective view of an oil contamination detector embodying the features of the present invention.

Fig. 2 is a sectional view taken on the line 2—2 of Fig. 1.

Fig. 3 is a sectional view taken on the line 3—3 of Fig. 2.

Fig. 4 is a sectional view taken on the line 4—4 of Fig. 2.

Fig. 5 is a sectional view taken on the line 5—5 of Fig. 2.

Fig. 6 is a cross-sectional view taken through the rotary sleeve, float-controlled outlet valve of the interior housing or tank of the detector, in open position.

Fig. 7 is a sectional view taken on the line 7—7 of Fig. 6.

Fig. 8 is a view similar to Fig. 6, showing the valve closed consequent upon raising of the float a part of its permissible upward travel as a result of a given level of oil superimposed on the level of water in the tank.

Fig. 9 is another view similar to Fig. 6, showing the valve still closed but in position wherein the float has traveled to its upper limit position owing to the continued inflow of inlet water into the tank, at which position of the float the electric signal switch will be closed and excess water will run off.

Fig. 10 is a bottom perspective view of the fixed outer shell or housing of the valve mentioned above.

Referring in detail to the drawing, the numeral 10 indicates the outer cylindrical casing of the detector, which is open at the top and closed by the bottom 11. Within the casing 10 is a reduced concentric cylindrical tank 12, also open at the top, of slightly shorter height than the casing 10, and having an external flange 13 resting on the rim of the open top of the casing. The flange 13 has circumferentially spaced screws 14 extending rigidly upward therethrough and through corresponding openings in a gasket 15 and a circular cover 16, so that, by means of nuts 17 applied to the tips of the screws, the cover 16 is held in place. Of course, any other suitable means to attach the cover may be provided.

An inlet pipe 17 preferably terminating in a funnel 18 provided with a screen 19, leads down through and may be integral with the cover 16. A vertical inlet tube 20 extends downward against the outside of the tank 12, in alignment with the pipe 17, and has its lower end 21 closed at a level above the bottom of the tank. Vertical spaced passages 22 are provided between the tube 20 and the tank, so that feed water flowing down the pipe 17 will enter the tank. The feed pipe 23, from which water passes into the funnel 18, is thus open to the air so that any steam which may be present in the feed water may escape and thus not be forced into the tank. A screened air vent 24 is also provided in the cover 16.

Vertically slidable in the tank 12 is a cylindrical float 25 having an axial passage 26 therethrough. An axial stem 27 extends downward from the cover 16 and through the passage 26 to act as a guide for the float. The float has an eyelet or sleeve 28 from which a deformed rod 29 is loosely suspended.

The bottom or floor 30 of the tank 12 has a row of openings 31 therethrough, positioned in a line near the edge of the floor. A cylindrical housing 32 mounted horizontally on its base 33, is set upon the floor with its axis parallel with the line of openings 31, the base being welded or otherwise secured to the floor. A longitudinal slot 34 through the base of the housing 32 is positioned vertically above the line of openings 31 and communicates with the interior of the housing. A cylindrical sleeve 35 is rotatably mounted within the cylindrical interior of the housing 32. A bolt or the like 36 passes axially through the housing 32 and the sleeve 35. The ends of arms 37 of a yoke 38 are provided with suitable openings for the passage therethrough of the bolt 36 by means of which the yoke arms are secured to the end walls 38 of the housing 32, with the help of a nut or the like, so that swinging movement of the yoke on its axis will synchronously turn the sleeve 35 on its axis.

The housing has a longitudinal row of openings 39 positioned, on that side of the housing nearer the center of the floor 30, at an angle of about fifty degrees from the slot 34. A second longitudinal row of openings 40 is positioned at an angle of about fifty degrees counterclockwise from the openings 39, Fig. 6. With the valve 41, which is presently being described, in the fully open position shown in Fig. 6, the angular positions of the rows of openings 42 and 43 provided therein are identical to those of the openings 39 and 40, respectively, with which they are in respective alignment. Additionally, a third row of openings 44 is provided through the sleeve in alignment with the slot 34. Thus, water accumulating or passing into the tank 12 through the passages 22 will pass through the open valve of Fig. 6 successively through openings 40, 43 and 44 and through slot 34 and the floor slots 31, into the casing 10. The yoke has a handle 45 pivoted to the lower end of the rod 29. It is apparent that when the sleeve 35 is rotated counter-clockwise through a small angle, the passages through the sleeve will disalign with those through the housing 32 and thus the valve will be closed, as shown in Fig. 8, and the valve will remain closed when rotated into the position of Fig. 9.

The outlet for water from the casing 10 is through a nipple 46 positioned at a level near the bottom of the tank 12 but well above the level of the valve 41. A vertical pipe 47 rises from the nipple 46 and terminates in a telescopically slidable elbow which can be raised or lowered to adjust the outlet level of the casing, leading to the intake pipe for the water system.

Under normal operating conditions, feed water in the tank 12 will flow through the valve 41 into the casing and out through the outlet 48. Normally, therefor, the level of water in the tank 12, assuming the outflow through the elbow 48 is equal to the inflow of feed water, will be at the level line indicated at 49, Fig. 2, with the float submerged part way approximately as shown in broken lines. When oil is present in the feed water, it will tend to accumulate above the level 49, so that when it has thickened to, say, the level 50 above the water level, it will exert an additional lifting force on the float, sufficient, through the arm 29 and yoke 38, to turn the valve sleeve 35 through the small angle between the positions thereof shown in Figs. 6 and 8, thus closing the valve. With the valve closed, water will obviously continue to rise in the tank 12, sufficiently to move the float all the way upward. Incidentally, a screened air vent 24 permits escape of air from the tank while water is thus rising in it.

A vertical stem 31 is attached to the top of the float 25, and passes slidably through an opening in the cover 16. The stem is in vertical alignment with a movable contact 52 positioned under a fixed contact 53, from which contacts leads lead, through an electrical source, to a board, not shown, on which a signal may be energized when the two contacts meet. Thus, as soon as the float has risen to cause the stem 51 to close the signal circuit, an attendant at the board may immediately turn off the feed water supply, or, if it is permitted to flow for a short time, it will carry the oil out through the overflow outlet 54.

A water gauge or glass 55 is mounted outside the casing 10 and is connected by elbows 56 with the compartment 57 between the casing and the tank 12. This enables checking on the condition of the water in the casing during operation of the feed system.

As is customary in such systems, provision is also made herein to check and detect excess salinity of the feed water. For this purpose a plug 58 is inserted into the bottom of the tank casing 10, having spaced electrodes 59 immersed in the water, and being adapted to be connected through its prongs 60 through an electrical circuit, not shown, to the same signal board or panel. Thus, upon the presence of excess salt in the water the corresponding signal will be given on the board. This is of course especially desirable in the case of ship installations.

Although the specific way of functioning set forth above for the various parts or accessories of the oil detector, other than the operation of the float controlled valve 41 and signal operating stem 51, may be modified or in part omitted, such changes are possible without altering the spirit of the invention as defined in the appended claims.

I claim:

1. A device of the class described comprising an upright cylindrical casing, a cylindrical tank of smaller length and diameter than the casing, said tank being mounted coaxially within the casing with the upper ends of the casing and tank substantially in a common plane and with the floor of the tank spaced above the floor of the casing, said tank floor having a passage therethrough, a normally open valve secured to the floor having an outlet communicating with said floor passage and an inlet above the floor in the tank, said valve having means rotatable through an arc for closing or opening the valve, said device having a feed water inlet into the tank and having a feed water outlet through the side of the casing at a level below the tank inlet, a float vertically slidable in said tank, said tank during normal operation of the device with feed water flowing in through the tank inlet and out through the casing outlet having water therein at a given level, said float normally resting on said water in the tank at a given position, means for restricting the float to vertical movement in the tank, an elongatable linkage connecting said float with said valve, said linkage with said float in said given position being substantially collapsed and said valve being open, an excess of oil in said water in the tank rising in the tank above said given level thereby raising said float above said given position to elongate said linkage and thus turn the valve through said arc to close the valve and shut off flow of water through the tank floor into the casing, consequent inflow of feed water into the tank further raising said float toward the top of the tank, and means on said float for actuating a signal alarm when said float approaches the top of the tank, said tank having an overflow outlet near the top thereof.

2. The device set forth in claim 1, said means for restricting said float comprising a vertical pin in said tank, said float having a vertical passage therethrough, said pin registering in said float passage.

3. The device set forth in claim 1, said last-named means comprising a stem extending upward from said float through the top of the device, an electric switch mounted above the top of the device in alignment with said stem and adjacent to the extremity of the stem actuable by the stem in said last-named position of the float to close the switch, said switch being adapted to be connected in an electrical circuit including said signal alarm.

4. The device set forth in claim 1, said device having a cover covering the top thereof and having a vent therethrough, said float restricting means comprising a pin extending axially downward from said cover, said float having an axial vertical passage therethrough, said pin registering in said passage of the float, said last-named means comprising a stem extending upward from said float through an opening in said cover, an electric switch mounted above the cover in alignment with said stem and closely adjacent to the extremity of the stem actuable by the stem in said last-named position of the float to close the switch, said switch being adapted to be connected in an electrical circuit including said signal alarm.

5. The device set forth in claim 1, said valve comprising a cylindrical housing having said valve outlet extending through the bottom thereof and said valve inlet extending therethrough at an arcuate distance from the valve outlet, a sleeve having closed ends rotatably mounted in said valve housing and having two passages therethrough spaced from each other at the same arcuate distance as the spacing of said valve outlet from said valve inlet, said linkage comprising an arm rigid with said sleeve at right angles thereto normally positioned approximately horizontally when said valve is in normal open position, and a link pivoted at one end to said arm and at the other end to the bottom of the float.

References Cited in the file of this patent

UNITED STATES PATENTS 2,667,629    Frost _____ Jan. 26, 1954